US012257675B2

(12) United States Patent
Joseph

(10) Patent No.: US 12,257,675 B2
(45) Date of Patent: Mar. 25, 2025

(54) LOWER CONTROL ARM DECOMMISSIONING DEVICE

(71) Applicant: JP Joseph LLC, Grand Blanc, MI (US)

(72) Inventor: James P. Joseph, Grand Blanc, MI (US)

(73) Assignee: JP Joseph LLC, Grand Blanc, MI (US)

( * ) Notice: Subject to any disclaimer, the term of this patent is extended or adjusted under 35 U.S.C. 154(b) by 178 days.

(21) Appl. No.: 17/843,305

(22) Filed: Jun. 17, 2022

(65) Prior Publication Data

US 2022/0402107 A1 Dec. 22, 2022

Related U.S. Application Data

(60) Provisional application No. 63/212,367, filed on Jun. 18, 2021.

(51) Int. Cl.

*B25B 11/00* (2006.01)
*B25B 27/00* (2006.01)
*B25B 27/06* (2006.01)

(52) U.S. Cl.

CPC ........ *B25B 27/064* (2013.01); *B25B 27/0035* (2013.01)

(58) Field of Classification Search

CPC ........... B25B 11/00; B25B 11/02; B23Q 3/00; B23Q 3/02; B23Q 3/06; B23Q 3/069; B23P 19/00

See application file for complete search history.

(56) References Cited

U.S. PATENT DOCUMENTS

2013/0341848 A1* 12/2013 Woods .................... B25B 5/003 269/37
2019/0366513 A1* 12/2019 Kousens ................. B25B 1/103
2022/0402107 A1* 12/2022 Joseph .................. B25B 27/064

* cited by examiner

*Primary Examiner* — Lee D Wilson
(74) *Attorney, Agent, or Firm* — Howard & Howard Attorneys PLLC

(57) ABSTRACT

A lower control arm decommissioning device is provided. The lower control arm decommissioning device includes a tabletop, a fixture operable to hold a lower control arm in a fixed position relative to the tabletop, and two opposing bushing removal tools configured for pushing simultaneously on two bushings of the lower control arm and displacing the two bushings from the lower control arm.

13 Claims, 13 Drawing Sheets

LOWER CONTROL ARM DECOMMISSIONING DEVICE

CROSS-REFERENCE TO RELATED APPLICATIONS

This disclosure claims priority to U.S. Provisional Patent Application No. 63/212,367 filed on Jun. 18, 2021, which is hereby incorporated by reference.

INTRODUCTION

The disclosure generally relates to a lower control arm decommissioning device.

A lower control arm is a suspension component of a vehicle. It connects the chassis of the vehicle to a suspension upright or hub attached to a wheel of the vehicle. In one embodiment, the lower control arm may include a body constructed with aluminum. A lower control arm may include a pair of rubberized bushings constructed with two annular steel members separated by a rubber ring. A lower control arm may further include other attached hardware. In one exemplary embodiment, a lower control arm may include an exemplary threaded fastener attached to a mid-portion of the body of the control arm. Such an exemplary threaded fastener may be constructed with steel.

SUMMARY

A lower control arm decommissioning device is provided. The device includes a tabletop, a fixture operable to hold a lower control arm in a fixed position relative to the tabletop, and two opposing bushing removal tools configured for pushing simultaneously on two bushings of the lower control arm and displacing the two bushings from the lower control arm.

In one embodiment, each of the two opposing bushing removal tools are configured for pushing outwardly upon an inner surface of a respective one of the two bushings.

In one embodiment, each of the two opposing bushing removal tools are configured for pushing inwardly upon an inner surface of a respective one of the two bushings.

In one embodiment, the fixture includes a first fixture, and the device further includes a second fixture. The first fixture is configured for holding a right lower control arm version of the lower control arm in a first position enabling the two opposing bushing removal tools to push on two bushings of the right lower control arm version of the lower control arm. The second fixture is configured for holding a left lower control arm version of the lower control arm in a second position enabling the two opposing bushing removal tools to push on two bushings of the left lower control arm version of the control arm.

In one embodiment, the device further includes a rotary tool configured for removing a threaded fastener from the lower control arm.

In one embodiment, the rotary tool is moveable from a third position configured for removing a threaded fastener from the right lower control arm version of the lower control arm to a fourth position configured for removing a threaded fastener from the left lower control arm version of the lower control arm.

In one embodiment, the device further includes a sensor device providing data related to determining which version of the lower control arm is present and a computerized device controller. The computerized device controller includes programming to monitor the data from the sensor device, determine which version of the lower control arm is present, and control movement of the rotary tool to the third position or the fourth position based upon the version of the lower control arm present.

In one embodiment, the device further includes a rotary tool configured for removing a threaded fastener from the lower control arm.

In one embodiment, the device further includes an air over hydraulics booster and two hydraulic actuators receiving pressurized hydraulic fluid from the air over hydraulics booster, each hydraulic actuator providing force to a respective one of the opposing bushing removal tools.

According to one alternative embodiment, a lower control arm decommissioning device is provided. The device includes a tabletop parallel to a ground surface, a fixture operable to hold a lower control arm in a fixed position relative to the tabletop, and a mobile table operable to move in a first direction parallel to the tabletop toward and away from the lower control arm. The device further includes a rotary tool connected to the mobile table and operable to remove a threaded fastener from the lower control arm and two opposing bushing removal tools configured for pushing simultaneously on two bushings of the lower control arm and displacing the two bushings from the lower control arm.

In some embodiments, the mobile table is further operable to move in a second direction perpendicular to the first direction and parallel to the tabletop.

In some embodiments, the mobile table is further operable to move in a third vertical direction.

In some embodiments, the fixture includes a first fixture, and the device further includes a second fixture. The first fixture is configured for holding a right lower control arm version of the lower control arm in a first position enabling the two opposing bushing removal tools to push on two bushings of the right lower control arm version of the lower control arm. The second fixture is configured for holding a left lower control arm version of the lower control arm in a second position enabling the two opposing bushing removal tools to push on two bushings of the left lower control arm version of the control arm.

In some embodiments, the mobile table is further operable to move in a second direction perpendicular to the first direction and parallel to the tabletop. The device further includes a sensor device providing data related to determining which version of the lower control arm is present and a computerized device controller. The computerized device controller includes programming to monitor the data from the sensor device, determine which version of the lower control arm is present, and control movement of the rotary tool in the first direction and the second direction based upon the version of the lower control arm present.

According to one alternative embodiment, a method for operating a lower control arm decommissioning device is provided. The method includes placing a lower control arm including two bushings to be removed in a fixture configured for holding the lower control arm in a fixed position relative to a tabletop of the lower control arm decommissioning device. The method further includes monitoring a control input from a user indicating that the lower control arm decommissioning device is to cycle and activating two hydraulic actuators to push two opposing bushing removal tools simultaneously against the two bushings to be removed to displace the two bushings to be removed from the lower control arm.

In some embodiments, the method further includes removing a threaded nut from the lower control arm.

In some embodiments, placing the lower control arm in the fixture includes disposing a first fixture configured for holding a right lower control arm version of the lower control arm upon the tabletop and disposing a second fixture configured for holding a left lower control arm version of the lower control arm upon the tabletop. The first fixture and the second fixture are each configured for aligning the two bushings to be removed with the two opposing bushing removal tools. The placing the lower control arm in the fixture further includes placing the lower control arm upon the first fixture or the second fixture based upon which version of the lower control arm is present.

In some embodiments, activating the two hydraulic actuators to push the two opposing bushing removal tools simultaneously against the two bushings to be removed includes applying at least 12,000 pounds of force against each of the two bushings.

The above features and advantages and other features and advantages of the present disclosure are readily apparent from the following detailed description of the best modes for carrying out the disclosure when taken in connection with the accompanying drawings.

DETAILED DESCRIPTION

Figure 1:
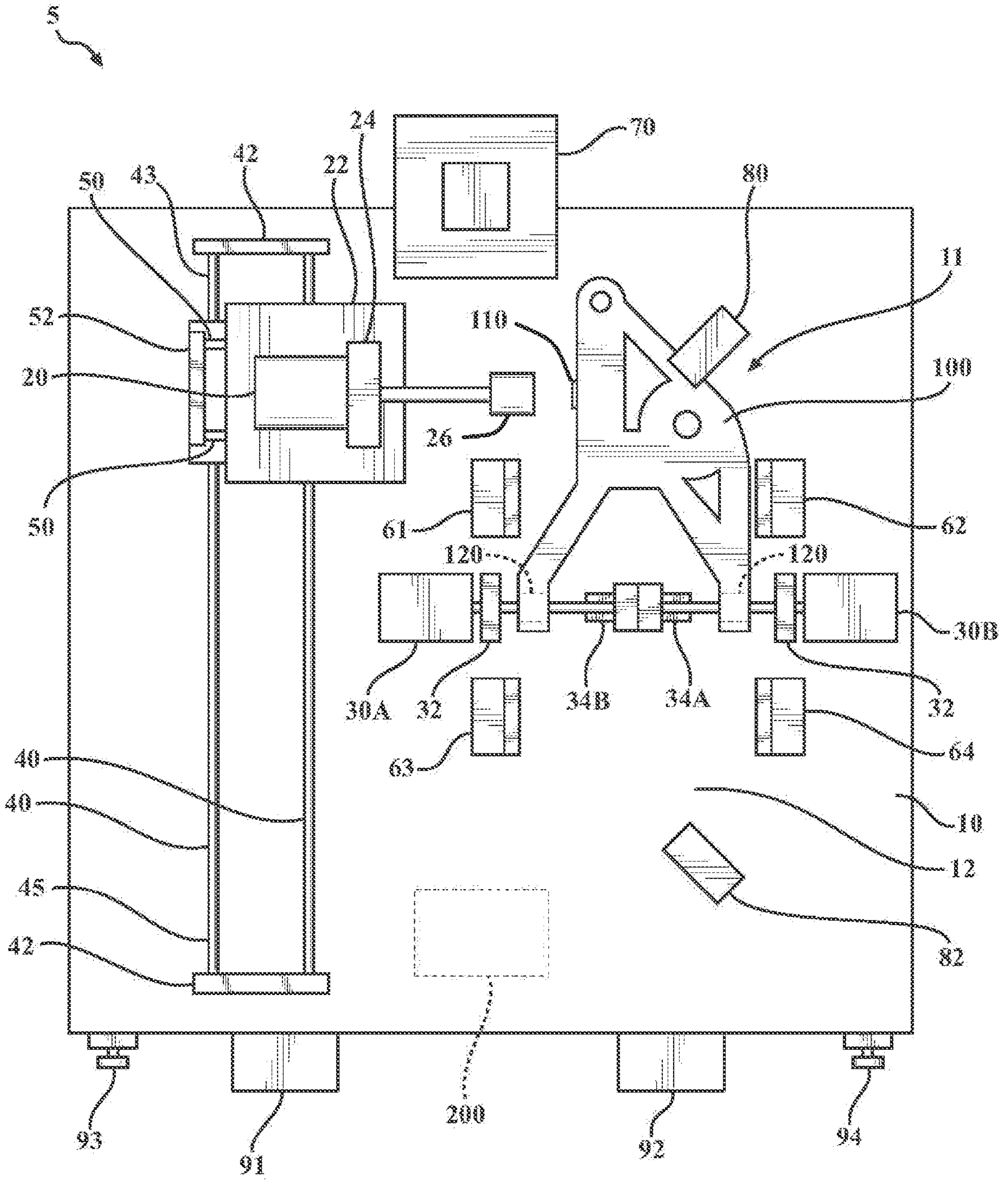
FIG. 1 schematically illustrates in top view a lower control arm decommissioning device decommissioning a right lower control arm, in accordance with the present disclosure.

A part such as a lower control arm may be constructed of aluminum, while components attached to the lower control arm may be constructed of steel or other materials. Recycling of vehicle components may be performed. However, recycling of a part including both aluminum and steel portions joined together may be problematic. Separation of the steel portion or portions from the aluminum portion may be beneficial.

A lower control arm may include two bushings pressed into mating cavities within an aluminum body of the lower control arm. Bushings connecting the lower control arm to the chassis of the body are subject to significant forces over the lifespan of a vehicle. As a result, bushings may be designed to be pressed into the mating cavities at high force or with a significant interference fit, such that the bushings will stay in place through the lifespan of the vehicle. In one exemplary embodiment, a bushing may be pressed into a mating cavity with 6,300 pounds of force. Removing such a bushing may involve significant force at least on a magnitude similar to the force used to install the bushing. In one embodiment, 12,000 to 13,000 pounds of force may be involved to rapidly remove the bushing from the mating cavity. Applying significant force to a part may cause significant movement in the part if the part is not adequately fixtured. Applying significant force to a part may involve significantly rigid or robust fixtures to hold the lower control arm in a fixed position while the bushing is removed.

By applying equal and opposite forces to a lower control arm, fixtures used to hold the lower control arm in a fixed position while force is applied to remove the bushing from the mating cavity may be made less robust. The fixtures no longer are used to counter the entire force applied to the bushing to hold the lower control arm in a fixed position. A lower control arm may be triangularly-shaped or wishbone-shaped. The bushings may be located at corners of a triangle or at the ends of legs of the wishbone. The bushings may each be described as including an inside surface facing an inside surface of the other bushing. The bushings may also be described as including an outside surface facing outwardly away from the other bushing. In one exemplary embodiment, an air supply line provides pneumatic pressure at 90 pounds per square inch, which is converted into hydraulic pressure. That hydraulic pressure is generated and is released through a T-valve, providing two simultaneously controlled hydraulic lines which provide pressure two hydraulic actuators that are configured to simultaneously provide two equal and opposite forces of approximately 13,000 pounds upon the part being decommissioned. In the examples of the Figures, the part being decommissioned is a lower control arm which is used in vehicle suspensions. In another embodiment, a similar decommissioning device could be used to decommission suspension knuckle parts which include high pressure pressed fittings or fixtures. By applying two simultaneous, equal, and opposite forces upon the part being decommissioned, high magnitude forces may quickly act upon the part being decommissioned without the part being flung across the room. Such an ability to apply high magnitude forces upon the parts in rapid succession is useful, for example, in high volume work where hundreds of thousands of lower control arms may need to be decommissioned.

In one embodiment, one tool may be applied to an inside surface of one of the bushings and a second tool may be applied to an inside surface of the other of the bushings. In this configuration, both tools are pushed outwardly, in opposite directions, against two opposing inside surfaces of the two bushings. In this way, the two equal and opposite forces applied to the lower control arm cancel each other out, and fixtures used to hold the lower control arm in place while the bushings are removed may be minimized.

In a second embodiment, one tool may be applied to an outside surface of one of the bushings and a second tool may be applied to an outside surface of the other of the bushings. In this configuration, both tools are pushed inwardly, in opposite directions, against two opposing outside surfaces of the two bushings. In this way, the two equal and opposite forces applied to the lower control arm cancel each other out, and fixtures used to hold the lower control arm in place while the bushings are removed may be minimized.

A threaded nut or other threaded fastener may be attached to the lower control arm. In one embodiment, a 55 millimeter hex head nut may be fastened to the aluminum body of the lower control arm. In one embodiment, the nut described herein may be described as a journal or as a hex head bolt with a threaded shaft. For similar reasons as related to the bushing, such a nut may be installed with a significant amount of torque. In addition, the nut may be installed with a liquid thread locking compound. Removing the nut may involve a torque of a similar or greater magnitude than the torque used to install the nut. In one embodiment, 2,500 foot pounds of torque may be involved to rapidly remove the nut from the lower control arm. In another embodiment, 2,000 foot pounds of torque may be involved to rapidly remove the nut from the lower control arm. Time to remove the nut, in exemplary tests, have ranged from about two to about ten seconds.

A vehicle includes right lower control arms and left lower control arms. The right lower control arm may be a mirror image of a left lower control arm. A fixture useful to remove a nut from lower control arms would benefit from an ability to remove the nut from either a right lower control arm or a left lower control arm.

A rapid speed or a fast cycle time of a method to decommission lower control arms may be desired. In one condition, wherein large numbers of lower control arms are deemed defective and are recalled, speed of the method may be of increased importance.

A lower control arm decommissioning device is provided. The lower control arm decommissioning device includes two opposing tools operable to apply equal and opposite forces upon a lower control arm to remove two bushings simultaneously from the lower control arm. The lower control arm decommissioning device may additionally include a rotary tool including a socket operable to apply torque to a nut attached to the lower control arm and remove the nut. The rotary tool may be mounted to a mobile table surface useful to move the rotary tool toward and away from the lower control arm. The mobile table may be further useful to move the rotary tool from a position operable to remove a nut from a right lower control arm to a position operable to remove a nut from a left lower control arm, such that the same device may be utilized to decommission both right lower control arms and left lower control arms.

Figure 2:
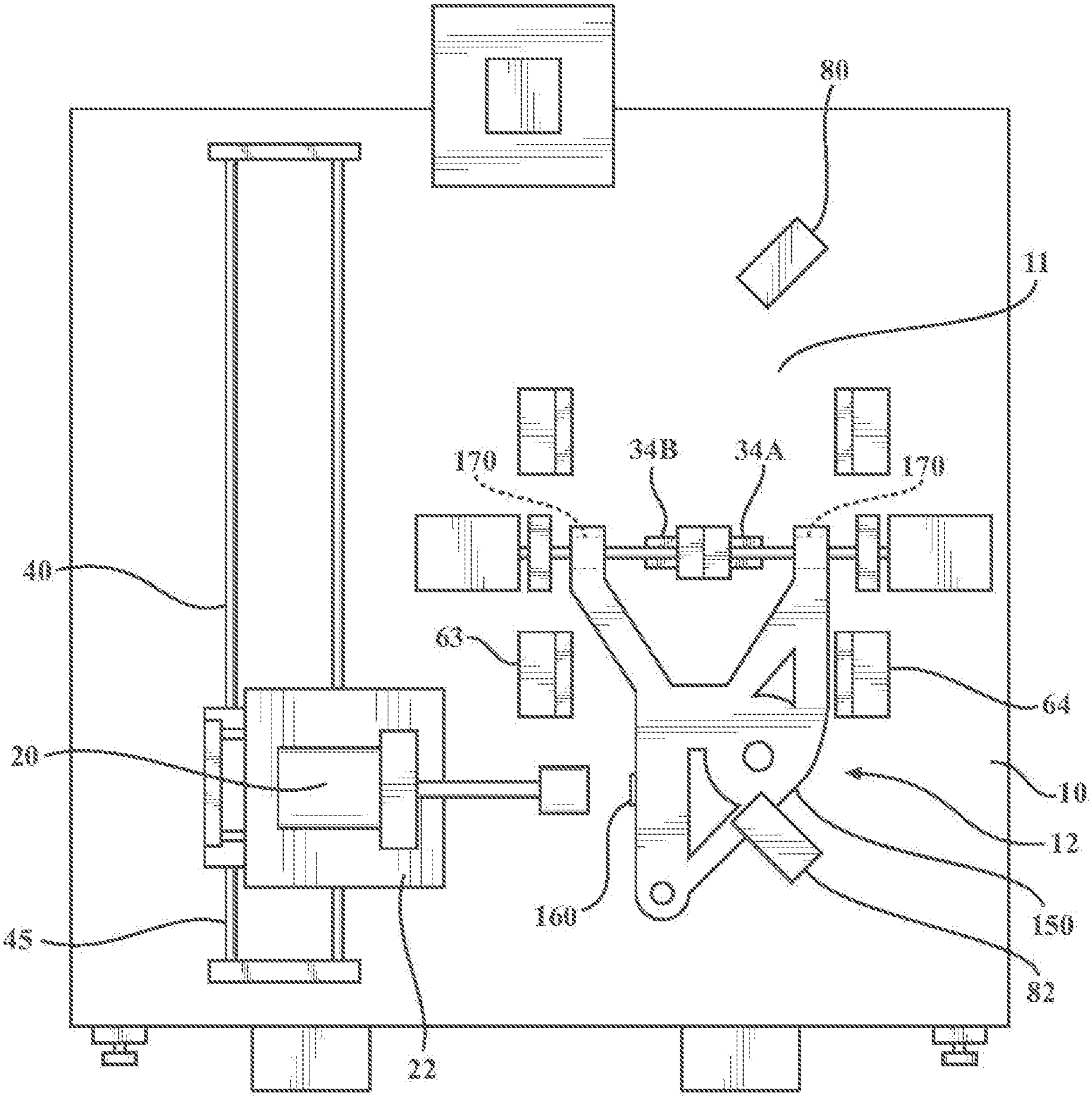
FIG. 2 schematically illustrates in top view the lower control arm of FIG. 1 decommissioning a left lower control arm, with the rotary tool having been moved from a first position on the tabletop to a second position on the tabletop to accommodate the change in nut position corresponding to the change in lower control arm configuration, in accordance with the present disclosure.

FIGS. 1 and 2 schematically illustrates in top view a lower control arm decommissioning device. FIG. 1 illustrates the lower control arm decommissioning device decommissioning a right lower control arm. Lower control arm decommissioning device 5 is illustrated including tabletop 10, a lower control arm 100 including a threaded nut 110 and two bushings 120 to be removed, a socket 26 of a rotary tool 20 operable to remove the nut 110, and two opposing bushing removal tools, bushing removal tool 34A and bushing removal tool 34B. The lower control arm 100 is illustrated fixtured to tabletop 10 upon tabletop portion 11. Fixture mechanism 80 is illustrated clamping, fastening, or otherwise holding a portion of the lower control arm 100 in place. Additionally, a moveable bracket 61 and a moveable bracket 62 are illustrated, which each may be moved to abut and additionally secure the lower control arm 100 upon tabletop 10. An optional air over hydraulics booster 70 is illustrated, utilizing pneumatic pressure to create hydraulic pressure. The air over hydraulics booster 70 is provided as one exemplary piece of equipment useful to generate hydraulic pressure useful to actuate the bushing removal tool 34A and the bushing removal tool 34B. Other configurations of equipment in the art may alternatively be utilized to generate the hydraulic pressure useful to actuate the bushing removal tool 34A and the bushing removal tool 34B, and the disclosure is not intended to be limited to the examples provided herein.

Rotary tool 20 is illustrated attached to mobile table 22. Mobile table 22 is connected to a first set of rails 50 enabling the mobile table 22 and the attached rotary tool 20 to move in a first direction toward and away from the lower control arm 100. Mobile table 22 is additionally connected to a second set of rails 40 enabling the mobile table 22 and the attached rotary tool 20 to move in a second direction perpendicular to the first direction along a surface of the tabletop 10. The mobile table 22 is illustrated disposed near a first side 43 of the rails 40. The rails 50 are held in place by a plurality of rail end blocks 52. The rails 40 are held in place by a plurality of rail end blocks 42. The rotary tool 20 is held in place by a retention block 24 bolted to the mobile table 22. The retention block 24 includes a hole or aperture through which a shaft connecting the rotary tool 20 and a socket 26 may extend.

The illustrated rails 40, 50 are provided as one exemplary system for enabling prescribed movement of the rotary tool 20. Other systems enabling movement of the rotary tool 20 are alternatively envisioned, for example, including an articulating robotic arm with the rotary tool 20 attached to an end of the articulating robotic arm. Movement of the rotary tool 20 along the illustrated rails 40, 50 may be accomplished by manual operation, with a user sliding the rotary tool into a desired position, or the rotary tool may be moved automatically, for example, with electronic servo motors moving the rotary tool along the rails 40, 50 based upon computerized control.

The rotary tool 20 may be powered by a number of power sources, including pneumatic or electrical power sources.

The two opposing bushing removal tools, the bushing removal tool 34A and the bushing removal tool 34B, are illustrated aligned with and retracted from the bushings 120 of the lower control arm 100. A first hydraulic actuator 30A is illustrated connected to and operable to extend and retract the bushing removal tool 34A. A second hydraulic actuator 30B is illustrated connected to and operable to extend and retract the bushing removal tool 34B. A shaft connecting the first hydraulic actuator 30A and the bushing removal tool 34A is illustrated held in place and aligned by a retention block 32. A shaft connecting the second hydraulic actuator 30B and the bushing removal tool 34B is illustrated held in place and aligned by another retention block 32. The first hydraulic actuator 30A and the second hydraulic actuator 30B are each connected to a hydraulic supply line operable to deliver to the first hydraulic actuator 30A and the second hydraulic actuator 30B a simultaneous controlling flow of hydraulic fluid, such that the bushing removal tool 34A and the bushing removal tool 34B may simultaneously extend in opposite directions, each pressing against one of the bushings 120 of the lower control arm 100. The bushing removal tool 34A and the bushing removal tool 34B are opposing bushing removal tools configured for pushing simultaneously on two bushings of the lower control arm and displacing the two bushings from the lower control arm. The bushing removal tools 34A, 34B are opposing, meaning that they apply equal and opposite forces upon the lower control arm or equal forces in opposite directions. Because the forces applied to the lower control arm are equal and opposite, forces of large magnitude may be applied to quickly displace the bushings to be removed from the lower control arm without tending to displace the lower control arm relative to a tabletop of the device.

Lower control arms are used on a right side of a vehicle and a left side of the vehicle. A right lower control arm version may be a mirror image of a left lower control arm version. The disclosed device 5 and corresponding method may address only one of the two versions of the lower control arm. Alternatively, the disclosed device 5 may be enabled to decommission either version of the lower control arm. Tabletop 10 is illustrated additionally including tabletop portion 12 including fixture mechanism 82, moveable bracket 63, and a moveable bracket 64. Tabletop portion 12 is operable to fixture a left lower control arm 100 upon tabletop 10 and mobile table 22 is operable to move toward a second end 45, such that tabletop 10 may service either a right control arm or a left control arm. Items may be attached to tabletop 10 with Sorbothane®, available through the Sorbothane, Inc. corporation of Kent, Ohio, United States, or similar dampening material.

Embodiments throughout the disclosure make use of a computerized controller 200. Activation pedal 91 and activation pedal 92 are provided, enabling an operator situated away from the tools of the lower control arm decommissioning device 5 to activate a sequence of operations or process by which the tools decommission the lower control arm affixed to the tabletop 10. Plexiglass shielding may be used to separate the user from the machinery of the lower control arm decommissioning device 5, as well as light curtains and other similar mechanisms in the art to keep personnel away from moving parts. A first stop button 93 and a second stop button 94 may be provided.

Lower control arm 100 is provided as an exemplary right lower control arm. FIG. 2 schematically illustrates in top view the lower control arm of FIG. 1 decommissioning a lower control arm 150 provided as an exemplary left lower control arm, with the rotary tool 20 having been moved from a first position on the tabletop to a second position on the tabletop to accommodate the change in nut position corresponding to the change in lower control arm configuration. The lower control arm 150 is illustrated including a nut 160 to be removed and two bearings 170 to be removed. The two bearings 170 may be removed by the same bearing removal tools, the bearing removal tool 34A and the bearing removal tool 34B, that are used to service the lower control arm 100 of FIG. 1. The fixture mechanism 82 is illustrated holding the lower control arm 150 in place upon the tabletop 10. Additionally, the moveable bracket 63 and the moveable bracket 64 are illustrated which each may be moved to abut and additionally secure the lower control arm 150 upon tabletop 10. Additionally, fixturing details may be mounted to the tabletop 10 including features configured for disposing the lower control arm 150 in a precise location and orientation with respect to the tabletop 10 and features and machinery attached thereto.

Figure 3:
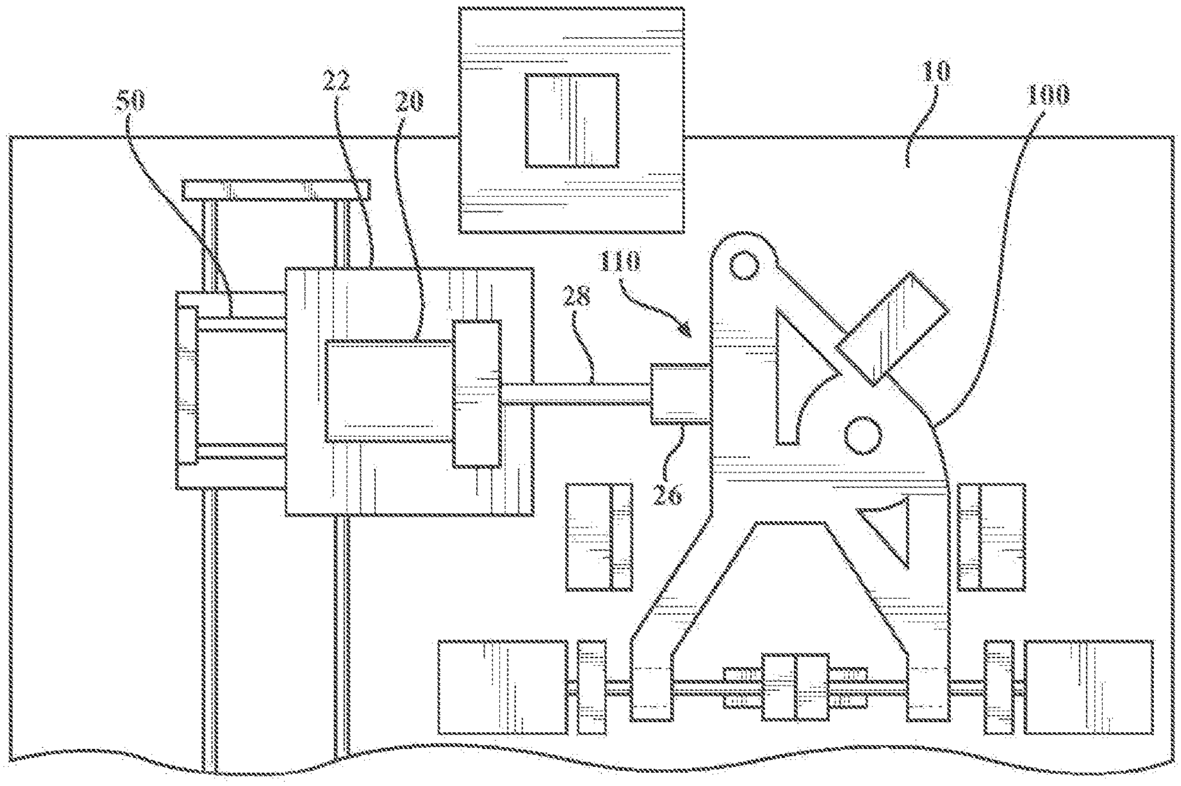
FIG. 3 schematically illustrates in top view a portion of the lower control arm decommissioning device of FIG. 1, with the rotary tool horizontally extended toward the lower control arm to engage a socket to a nut upon the lower control arm to remove the nut, in accordance with the present disclosure.

FIG. 3 schematically illustrates in top view a portion of the lower control arm decommissioning device of FIG. 1, with the rotary tool 20 horizontally extended toward the lower control arm 100 to engage a socket 26 to a nut 110 upon the lower control arm 100 to remove the nut 110. The rotary tool 20 is mounted to mobile table 22. Rails 50 enable the mobile table 22 to move left and right upon the illustrated tabletop 10. Shaft 28 enables the rotary tool 20 to selectively apply torque to socket 26, such that socket 26 may engage with the nut 110 for the purpose of applying a torque to the nut 110 to remove it from the lower control arm 100. In one embodiment, the rotary tool 20 may be an impact wrench which may be utilized to exert high torque to the shaft 28, for example, by storing energy in an internal rotating mass and then delivering that stored energy in a burst to the shaft 28.

Figure 4:
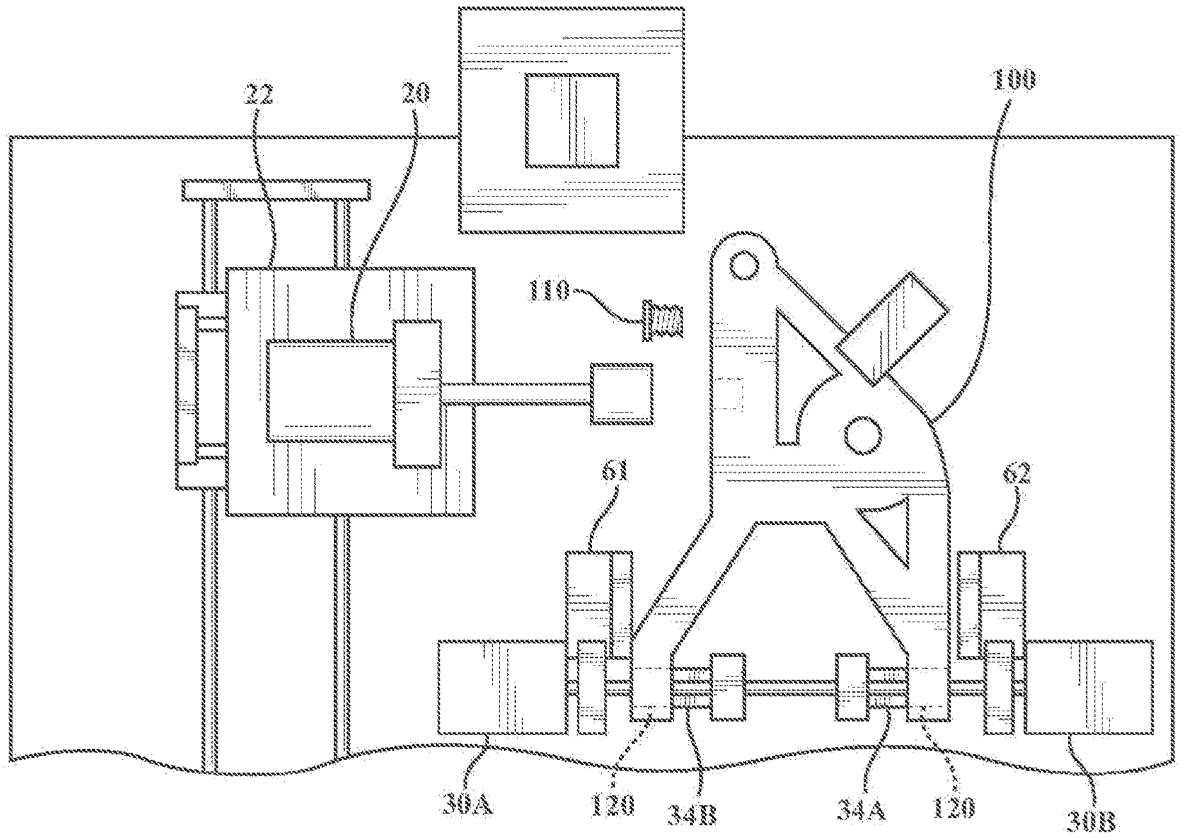
FIG. 4 schematically illustrates in top view the portion of the lower control arm decommissioning device of FIG. 3, with the rotary tool horizontally retracted away from the lower control arm, with the nut disengaged from the lower control arm, and with two opposing bushing removal tools extended against inside surfaces of two bushings of the lower control arm, in accordance with the present disclosure.

FIG. 4 schematically illustrates in top view the portion of the lower control arm decommissioning device of FIG. 3, with the rotary tool 20 and the mobile table 22 horizontally retracted away from the lower control arm 100, with the nut 110 disengaged from the lower control arm 100, and with two opposing bushing removal tools, the bushing removal tool 34A and the bushing removal tool 34B, extended against inside surfaces of two bushings 120 of the lower control arm 100. The first hydraulic actuator 30A extends the bushing removal tool 34A, and the second hydraulic actuator 30B extends the bushing removal tool 34B.

Figure 5:
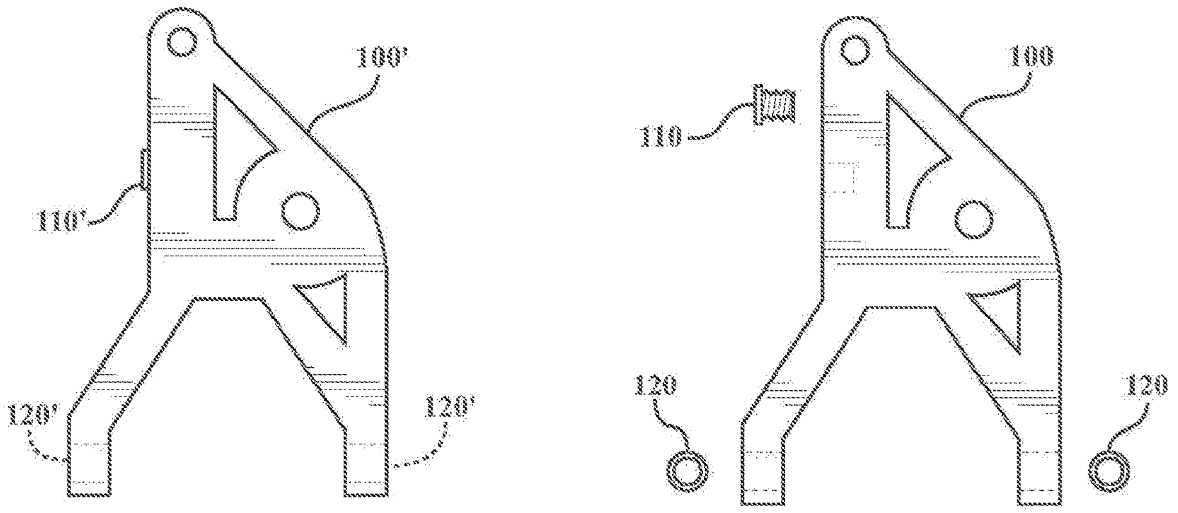
FIG. 5 schematically illustrates in top view the portion of the lower control arm decommissioning device of FIG. 3, with the two opposing bushing removal tools retracted and with the lower control arm removed from the device, in accordance with the present disclosure.
Figure 5:
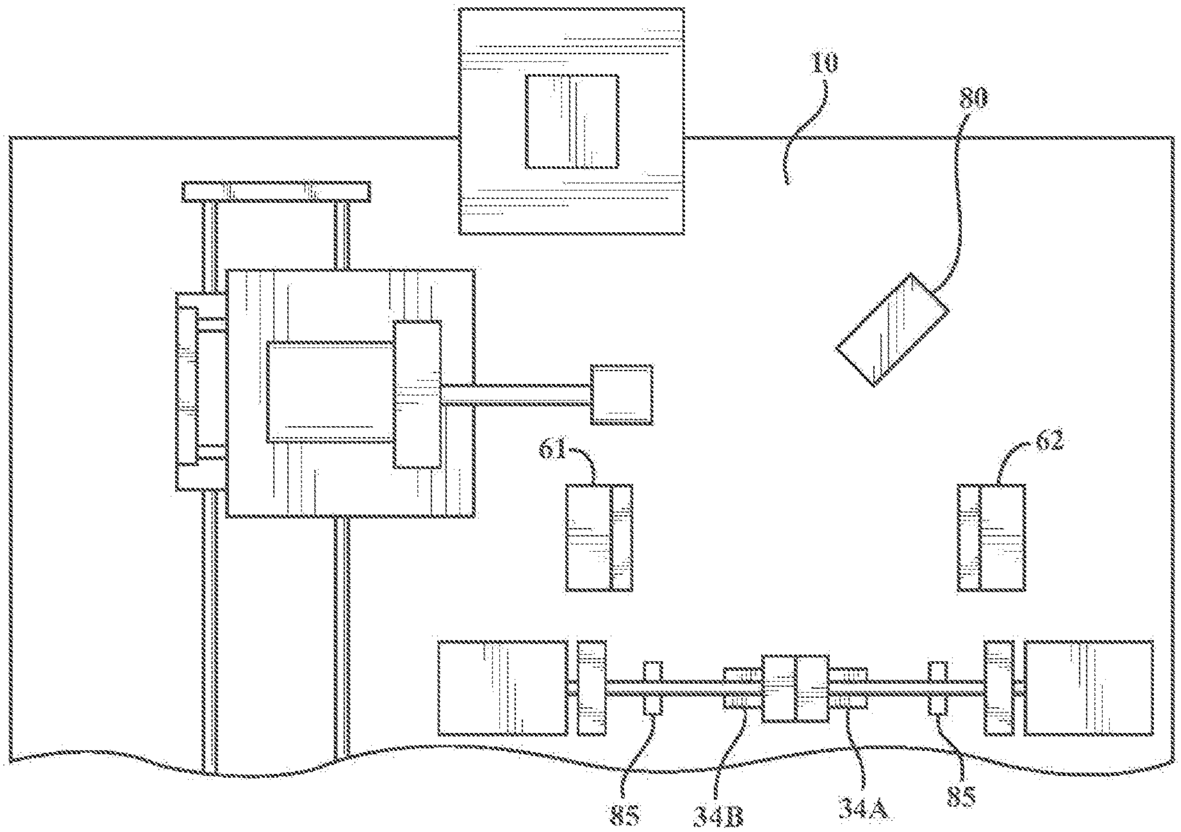

FIG. 5 schematically illustrates in top view the portion of the lower control arm decommissioning device of FIG. 3, with the two opposing bushing removal tools, the bushing removal tool 34A and the bushing removal tool 34B, retracted and with the lower control arm 100 removed from the device. Support fixtures 85 are illustrated, which may be metal blocks, provided for the lower control arm 100 to rest upon when the lower control arm 100 is affixed to the device. The moveable bracket 61 and the moveable bracket 62 are illustrated retracted, and the fixture mechanism 80 is illustrated configured to release the lower control arm 100. The nut 110 and the two bushings 120 are illustrated removed from the lower control arm 100, such that the parts may be recycled.

Additionally, a second lower control arm 100' including a nut 110' and two bushings 120' is illustrated in preparation for being loaded upon and affixed to the device for subsequent repetition of the disclosed sequence or method.

Figure 6:
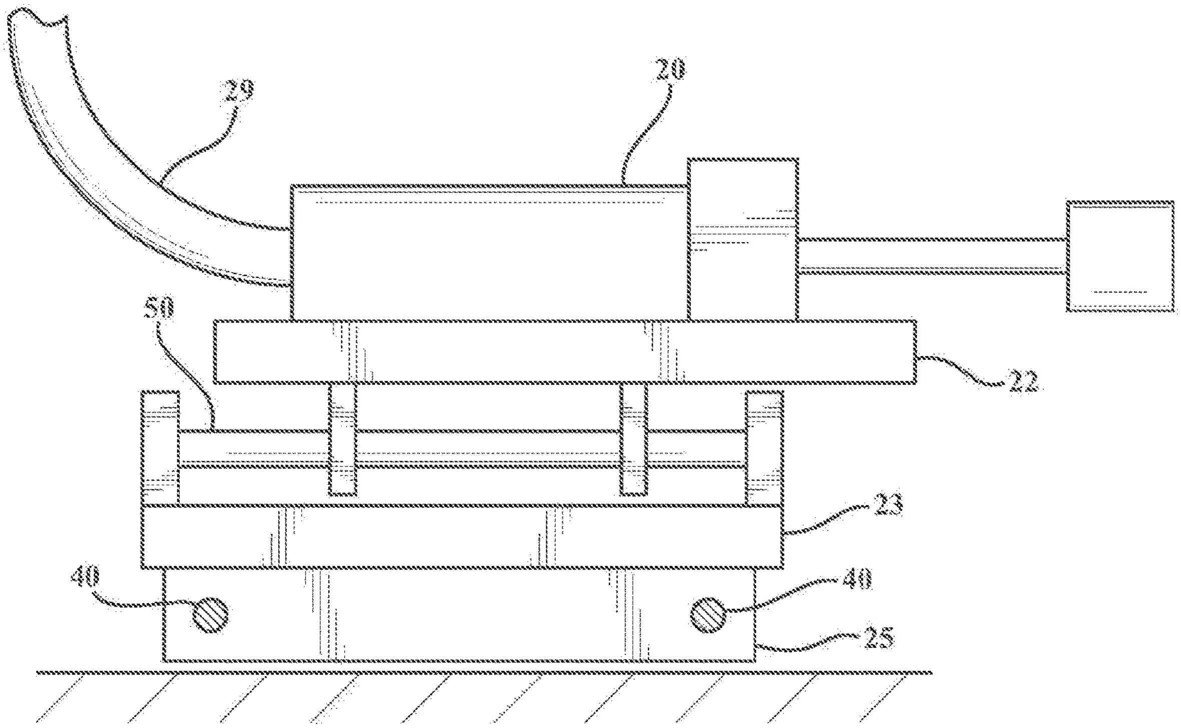
FIG. 6 schematically illustrates in front cross-sectional view the rotary tool and a mobile table operable to selectively move the rotary tool in a first direction toward and away from the lower control arm and additionally to selective move the rotary tool in a second direction perpendicular to the first direction along a surface of the tabletop, in accordance with the present disclosure.

FIG. 6 schematically illustrates in front cross-sectional view the rotary tool 20 and the mobile table 22 operable to selectively move the rotary tool 20 in a first direction toward and away from the lower control arm and additionally to selective move the rotary tool 20 in a second direction perpendicular to the first direction along a surface of the tabletop. A pneumatic line 29 or line with pressurized air is illustrated providing pressurized air to the rotary tool 20. In the alternative, the rotary tool 20 may be electrically powered. The mobile table 22 is connected to rails 50 which are connected to lower table 23. Lower table 23 is connected to rails 40 with sliding blocks 25.

Figure 7:
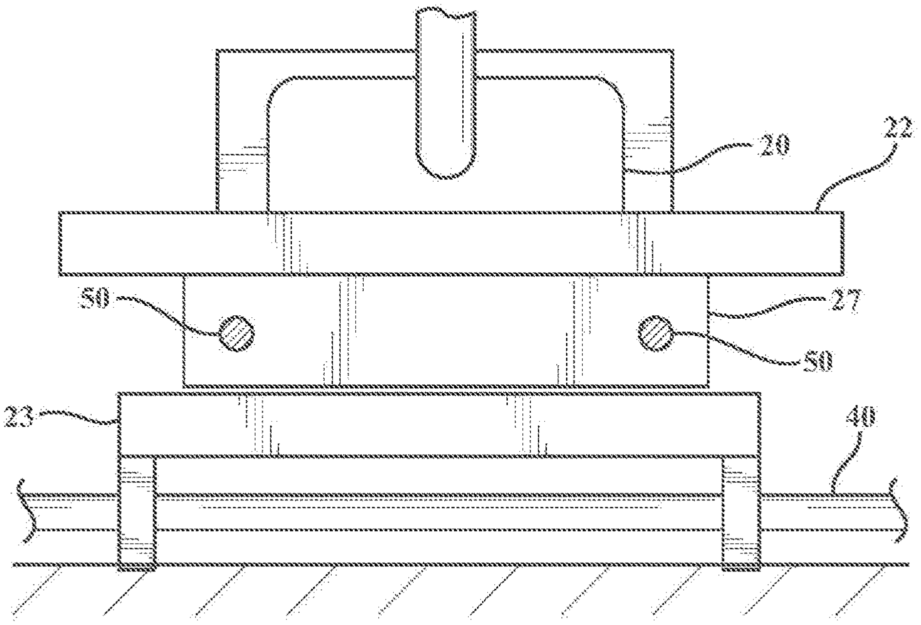
FIG. 7 schematically illustrate in left side cross-sectional view the rotary tool and the mobile table of FIG. 6, in accordance with the present disclosure.

FIG. 7 schematically illustrates in left side cross-sectional view the rotary tool 20 and the mobile table 22 of FIG. 6. The rotary tool 20 is connected to rails 50 with sliding blocks 27. The rails 50 are connected to the lower table 23 which is connected to the rails 40.

Figure 8:
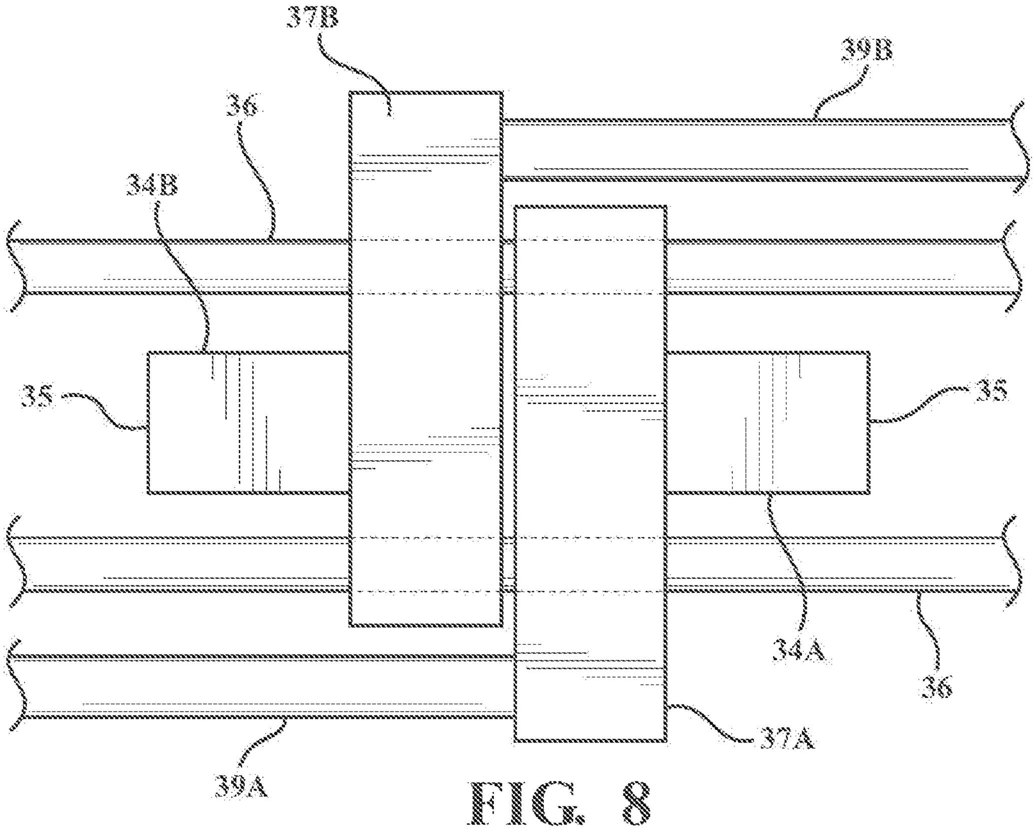
FIG. 8 schematically illustrates in front view the two opposing bushing removal tools of FIG. 1 in a retracted state, in accordance with the present disclosure.

FIG. 8 schematically illustrates in front view the two opposing bushing removal tools of FIG. 1 in a retracted state. The bushing removal tool 34A is connected to a carrier block 37A. The carrier block 37A is connected to shaft 39A which is moved left and right by the first hydraulic actuator 30A of FIG. 1. The carrier block 37A includes two cavities or through-hole recesses defined by cylindrically-shaped inner walls, through which two stationary rails 36 are disposed. The carrier block 37A may move right and left upon the rails 36, thereby moving the bushing removal tool 34A left and right.

The bushing removal tool 34B is connected to a carrier block 37B. The carrier block 37B is connected to shaft 39B which is moved left and right by the second hydraulic actuator 30B of FIG. 1. The carrier block 37B includes two cavities or through-hole recesses defined by cylindrically-shaped inner walls, through which the two stationary rails 36 are disposed. The carrier block 37B may move right and left upon the rails 36, thereby moving the bushing removal tool 34B left and right.

Axial forces applied by the shafts 39A, 39B provide for movement of the carrier blocks 37A, 37B, respectively. The recesses of the carrier blocks 37A, 37B, and the stationary rails 36 provide for alignment of the bushing removal tools 34A, 34B attached to the carrier blocks 37A, 37B, respectively.

Each of the bushing removal tool 34A and the bushing removal tool 34B are equipped with an end 35 operable to engage a bushing and press the bushing out of the mating cavity of a lower control arm. The end 35 may have different geometries based upon factors such as the geometry of the bushing.

Figure 9:
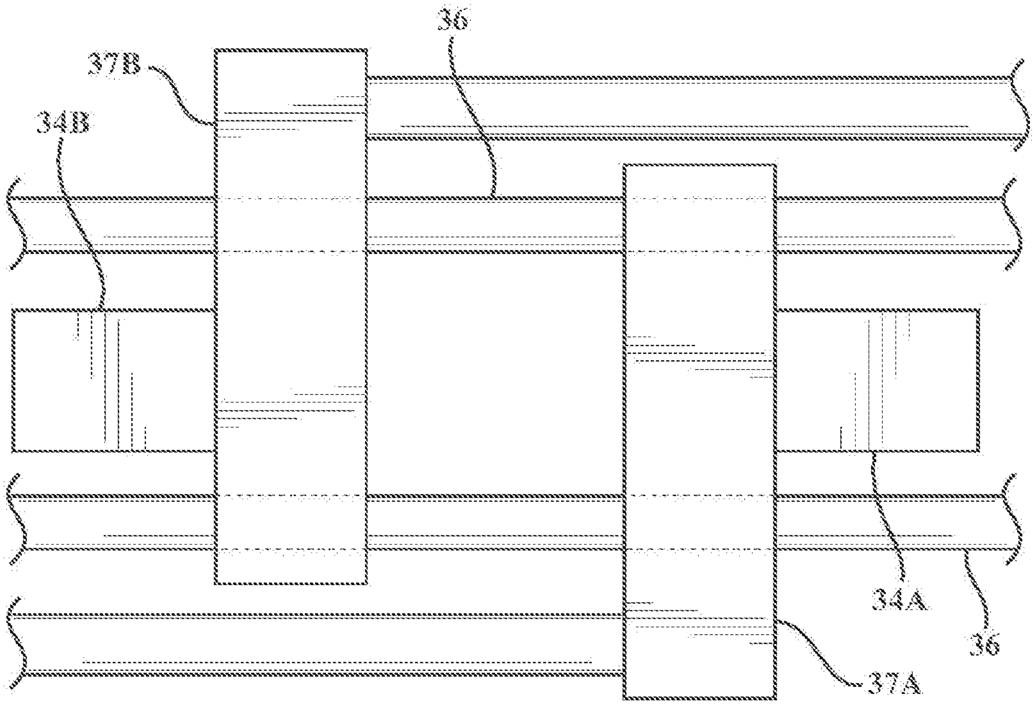
FIG. 9 schematically illustrates in front view the two opposing bushing removal tools of FIG. 1 in an extended state, in accordance with the present disclosure.

FIG. 9 schematically illustrates in front view the two opposing bushing removal tools of FIG. 1 in an extended state. The bushing removal tool 34A and the carrier block 37A are illustrated extended to the right. The bushing removal tool 34B and the carrier block 37B are illustrated extended to the left. The rails 36 maintain an alignment of each of the carrier block 37A and the carrier block 37B, such that the attached bushing removal tools will be correctly aligned with bushings of a lower control arm.

Figure 10:
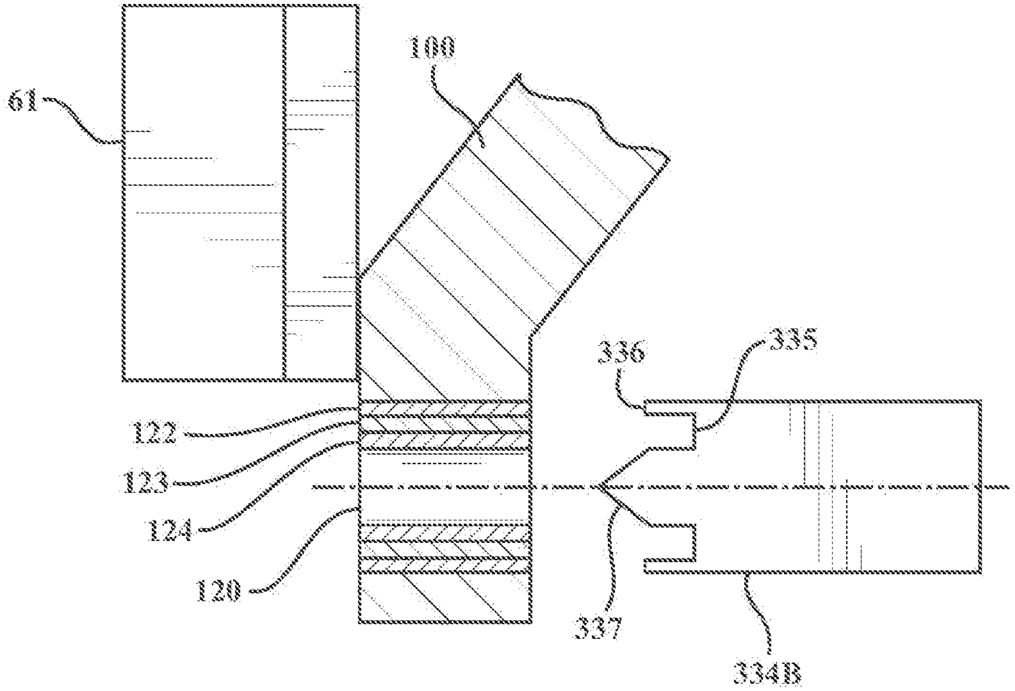
FIG. 10 schematically illustrates in cross-sectional view one alternative embodiment of a bushing removal tool disposed next to and in preparation to removing a bushing from a lower control arm, in accordance with the present disclosure.

FIG. 10 schematically illustrates in cross-sectional view one alternative embodiment of a bushing removal tool 334B disposed next to and in preparation to removing one of the bushings 120 from the lower control arm 100. The moveable bracket 61 is illustrated moved into position abutting the lower control arm 100 such that the lower control arm 100 is adequately affixed in a desired position.

The exemplary bushing 120 is a rubberized bushing, with a first outer ring shaped steel band 122 and a second inner ring shaped steel band 124 separated by a ring shaped rubber portion 123. Such a rubberized bushing is used with control arms to provide dampening between the suspension components and the attached chassis.

The bushing removal tool 334B includes an annular surface 336 which is operable to press against the first outer ring shaped steel band 122 of the bushing 120. The bushing removal tool 334B further includes a cone shaped portion 337 which is operable to engage with the second inner ring shaped steel band 124 and align the bushing removal tool 334B to the bushing 120. Further, the bushing removal tool 334B includes an annular recess 335 operable to avoid the tool contacting the ring shaped rubber portion 123.

Figure 11:
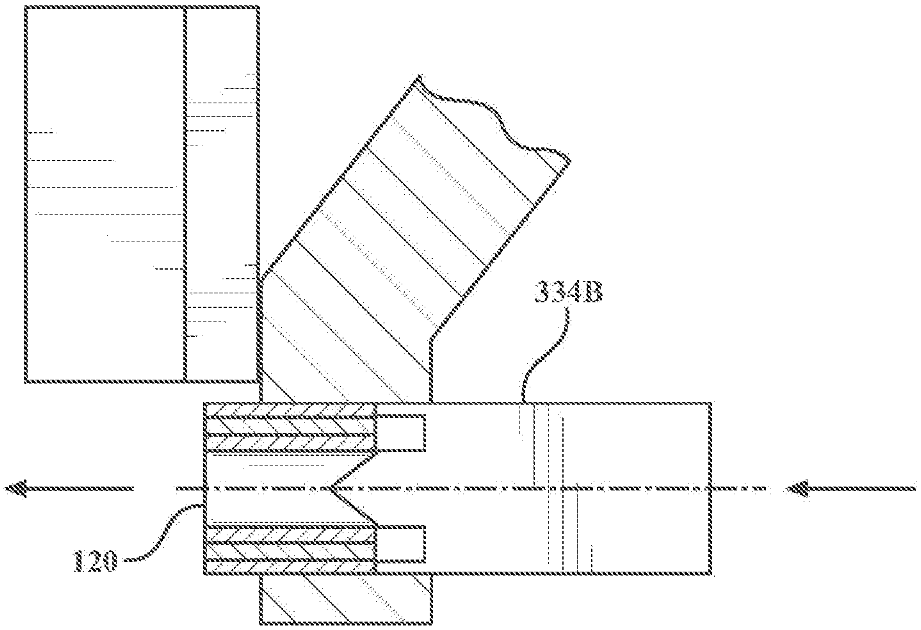
FIG. 11 schematically illustrates in cross-sectional view the bushing removal tool of FIG. 10 extending toward and applying force to the bushing for the purpose of removing the bushing from the lower control arm, in accordance with the present disclosure.

FIG. 11 schematically illustrates in cross-sectional view the bushing removal tool 334B of FIG. 10 extending toward and applying force to the bushing 120 for the purpose of removing the bushing from the lower control arm.

Figure 12:
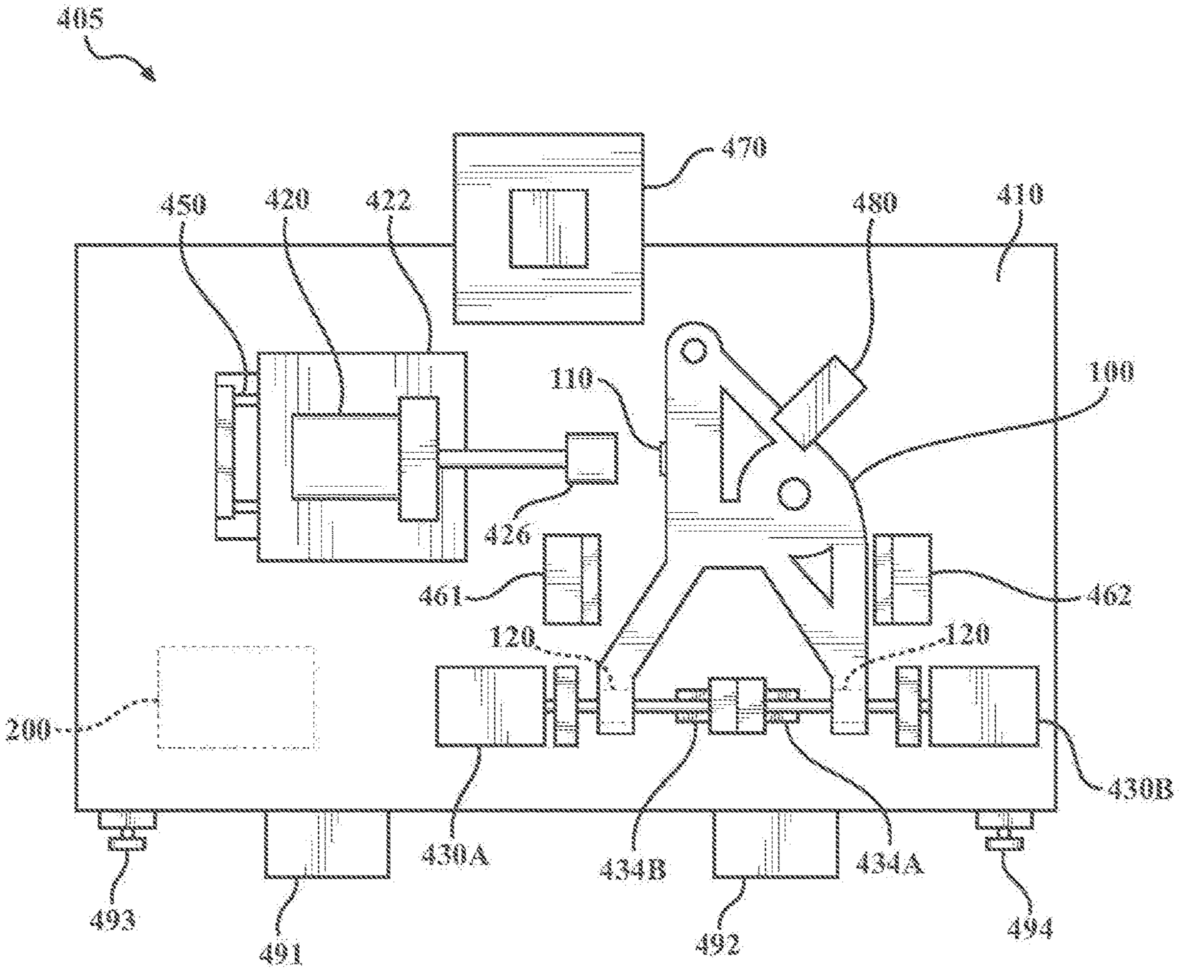
FIG. 12 schematically illustrates in top view an alternative embodiment of a lower control arm decommissioning device, wherein the rotary tool is operable to extend toward and retract away from a lower control arm, in accordance with the present disclosure.

FIG. 12 schematically illustrates in top view an alternative embodiment of a lower control arm decommissioning device, wherein the rotary tool is operable to extend toward and retract away from a lower control arm. Lower control arm decommissioning device 405 is illustrated including tabletop 410, a lower control arm 100 including a nut 110 and two bushings 120 to be removed, a rotary tool 420 operable to remove the nut 110, and two opposing bushing removal tools, bushing removal tool 434A and bushing removal tool 434B. The lower control arm 100 is illustrated fixtured to tabletop 410. Fixture mechanism 480 is illustrated clamping, fastening, or otherwise holding a portion of the lower control arm 100 in place. Additionally, a moveable bracket 461 and a moveable bracket 462 are illustrated, which each may be moved to abut and additionally secure the lower control arm 100 upon tabletop 410. An air over hydraulics booster 470 is illustrated, utilizing pneumatic pressure to create hydraulic pressure.

The rotary tool 420 is illustrated attached to mobile table 422. Mobile table 422 is connected to a set of rails 450 enabling the mobile table 422 and the attached rotary tool 420 to move in a first direction toward and away from the lower control arm 100. The rotary tool 420 is connected to socket 426 which is operable to apply torque to the nut 110.

The two opposing bushing removal tools, the bushing removal tool 434A and the bushing removal tool 434B, are illustrated aligned with and retracted from the bushings 120 of the lower control arm 100. A first hydraulic actuator 430A is illustrated connected to and operable to extend and retract the bushing removal tool 434A. A second hydraulic actuator 430B is illustrated connected to and operable to extend and retract the bushing removal tool 434B. The first hydraulic actuator 430A and the second hydraulic actuator 430B are each connected to a hydraulic supply line operable to deliver to the first hydraulic actuator 430A and the second hydraulic actuator 430B a simultaneous controlling flow of hydraulic fluid, such that the bushing removal tool 434A and the bushing removal tool 434B may simultaneously extend in opposite directions, each pressing against one of the bushings 120 of the lower control arm 100.

A computerized controller 200 is illustrated. Activation pedal 491 and activation pedal 492 are provided, enabling an operator situated away from the tools of the lower control arm decommissioning device 405 to activate a sequence of operations or method by which the tools decommission the lower control arm affixed to the tabletop 410. A first stop button 493 and a second stop button 494 may be provided.

Figure 13:
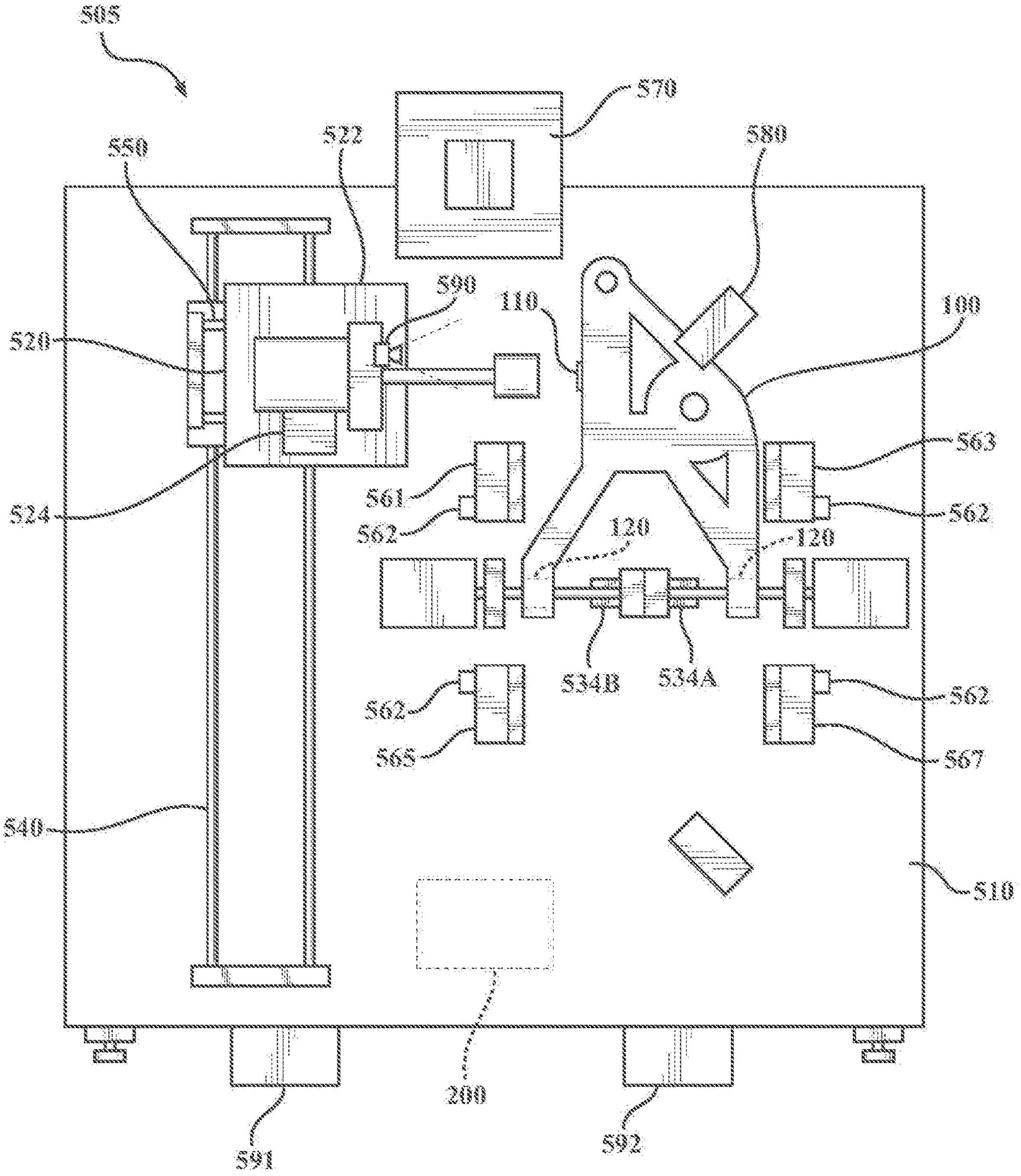
FIG. 13 schematically illustrates in top view an alternative embodiment of a lower control arm decommissioning device, wherein movement of various portions of the device is automatically controlled by a computerized controller, in accordance with the present disclosure.

FIG. 13 schematically illustrates in top view an alternative embodiment of a lower control arm decommissioning device, similar to the device 5 of FIG. 1 with an exception that movement of various portions of the device is automatically controlled by a computerized controller. Lower control arm decommissioning device 505 is illustrated including tabletop 510, a lower control arm 100 including a nut 110 and two bushings 120 to be removed, a rotary tool 520 operable to remove the nut 110, and two opposing bushing removal tools, bushing removal tool 534A and bushing removal tool 534B. The lower control arm 100 is illustrated fixtured to tabletop 510. Fixture mechanism 580 is illustrated clamping, fastening, or otherwise holding a portion of the lower control arm 100 in place. Additionally, a moveable bracket 561 and a moveable bracket 563 are illustrated, which each may be moved to abut and additionally secure the lower control arm 100 upon tabletop 510. Alternative moveable bracket 565 and alternative moveable bracket 567 are illustrated for use with a mirror image embodiment of the lower control arm 100, as described in relation to FIG. 2. An air over hydraulics booster 570 is illustrated, utilizing pneumatic pressure to create hydraulic pressure.

Rotary tool 520 is illustrated attached to mobile table 522. Mobile table 522 is connected to a first set of rails 550 enabling the mobile table 522 and the attached rotary tool 520 to move in a first direction toward and away from the lower control arm 100. Mobile table 522 is additionally connected to a second set of rails 540 enabling the mobile table 522 and the attached rotary tool 520 to move in a second direction perpendicular to the first direction along a surface of the tabletop 510. The mobile table 522 is illustrated disposed near a first side of the rails 540. A bushing removal tool 534A and a bushing removal tool 534B are illustrated, each attached to and controlled by a hydraulic actuator.

The mobile table 522 includes a mobile table motor device 524, which includes one or more electric motors operable to move the mobile table 522 along the rails 540 and the rails 550. Each of the moveable bracket 561, the moveable bracket 563, the moveable bracket 565, and the moveable bracket 567 include a motorized unit 562 operable to control movement of the respective moveable bracket. A sensor device 590 is illustrated situated to gather and provide data related to a location, orientation, type, and/or condition of a lower control arm affixed to the tabletop 510. The sensor device may be a camera device, a light detection and ranging (LIDAR) device, a laser emitting and measuring device, or any other similar sensor device useful to gather data regarding the lower control arm 100. Using data from activation pedal 591, activation pedal 592, sensor device 590, the computerized controller 200 may issue electronic commands to control movement and operation of the rotary tool 520, the moveable bracket 561, the moveable bracket 563, the moveable bracket 565, the moveable bracket 567, and the opposing bushing removal tools, bushing removal tool 534A and bushing removal tool 534B.

Figure 14:
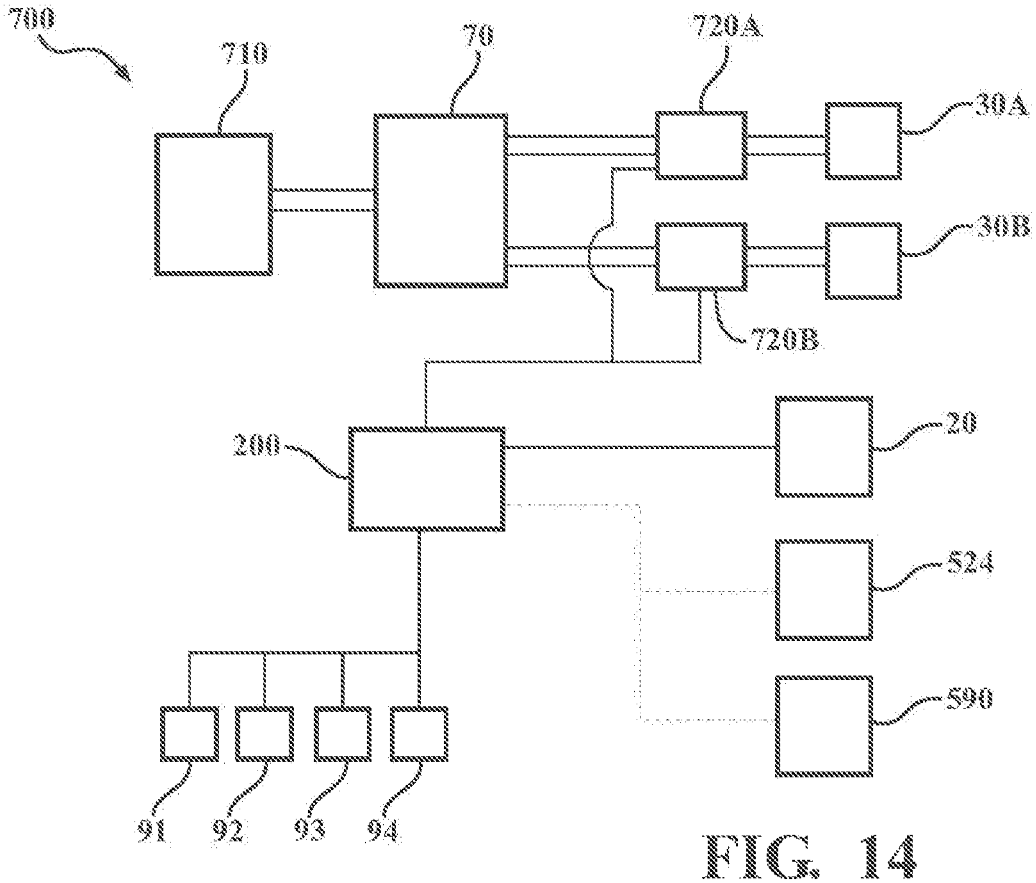
FIG. 14 schematically illustrates electronic, pneumatic, and hydraulic control devices utilized to operate the lower control arm decommissioning device, in accordance with the present disclosure.

FIG. 14 schematically illustrates electronic, pneumatic, and hydraulic control devices utilized to operate the lower control arm decommissioning device. Control system 700 is illustrated including the computerized controller 200 receiving and providing electronic signals useful to control the control system 700. Electronic signals may be sent and received over physical wires, such as a communications bus device, and/or over a wireless communication network. Pneumatic pump 710 is illustrated providing pressurized air to the control system 700. The pneumatic pump 710 may be part of the control system 700 or may be remote, with a supply of pressurized air being provided to the control system 700. The pressurized air is supplied to the air over hydraulics booster 70 which creates two flows of pressurized hydraulic fluid. Two electronically controlled solenoid valves, valve 720A and valve 720B, receive command signals from the computerized controller 200 and are used to control flow of the pressurized hydraulic fluid to the first hydraulic actuator 30A and second hydraulic actuator 30B, respectively.

The computerized controller 200 further receives inputs from the activation pedal 91, the activation pedal 92, the stop button 93, and the stop button 94. The computerized controller further provides electronic command signals to the rotary tool 20. If movement of the various components is motorized and controlled (e.g. if the mobile table motor device 524 is present) the computerized controller provides electronic command signals to the motors. If a sensor device 590 is present, the computerized controller 200 receives data from the sensor device 590.

Figure 15:
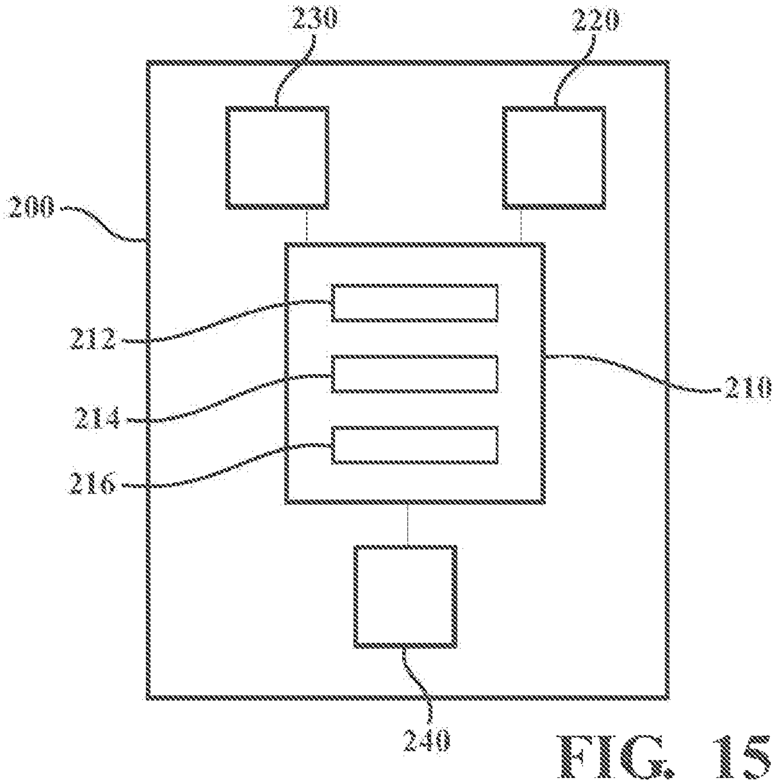
FIG. 15 schematically illustrates a computerized controller operable to provide control signals to the lower control arm decommissioning device, in accordance with the present disclosure.

FIG. 15 schematically illustrates a computerized controller 200 operable to provide control signals to the lower control arm decommissioning device. The computerized controller includes a processor device 210, a communications device 220, an input/output device 230, and a durable memory device 240.

The processor device 210 includes a computerized processor operable to execute stored programming, random access memory (RAM), and access to durable memory such as a hard drive, flash memory, or similar data storage. The processor device 210 includes a plurality of programmed modules or programs useful to implement programmed sequences or methods. In the exemplary processor device 210, a rotary tool control module 212, a bushing removal tool control module 214, and a decommissioning sequence operation module 216 are provided.

The communications device 220 includes hardware for the computerized controller 200 to send and receive signals from various electronic components of the lower control arm decommissioning device. The input/output device 230 includes hardware useful to provide desired control over electronic solenoids and the rotary tool and additionally includes hardware useful to coordinate data received from devices such as activation pedal 91 and activation pedal 92. The durable memory device 240 includes a hard drive, flash memory, or other similar device useful to store programmed code, parameters for operation, data useful to process inputs such as captured images, and other such data that can be stored. The computerized controller 200 is provided as an example, other computerized devices may be similarly utilized, and the disclosure is not intended to be limited to the examples provided herein.

Figure 16:
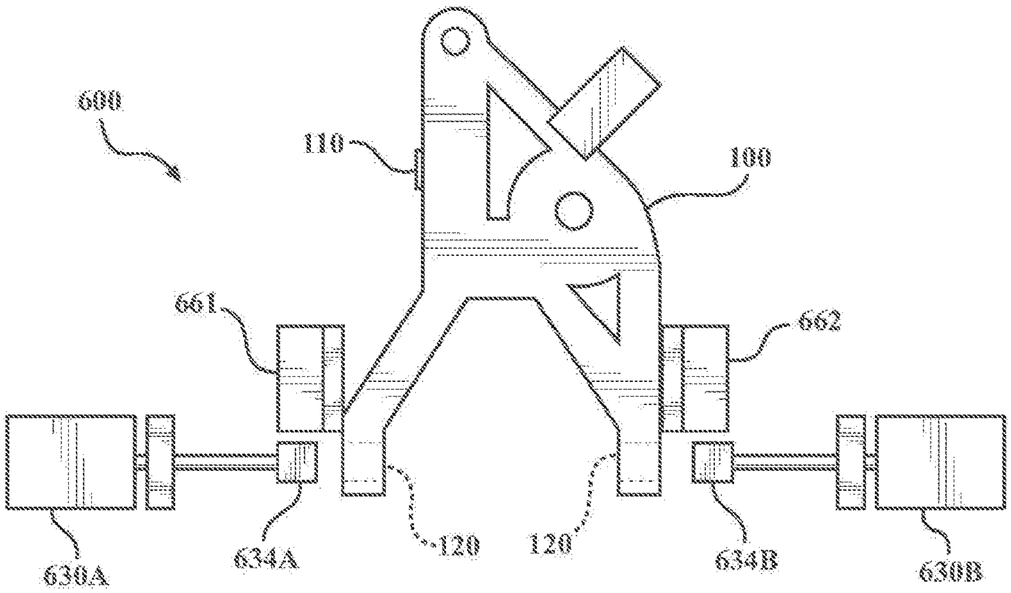
FIG. 16 schematically illustrates an alternative embodiment of opposed bushing removal tools, including tools aligned to contact outer surfaces of two bushings attached to the lower control arm, in accordance with the present disclosure.

FIG. 16 schematically illustrates an alternative embodiment of opposed bushing removal tools, including tools aligned to contact outer surfaces of two bushings attached to the lower control arm 100. Configuration 600 is illustrated including the lower control arm 100, a moveable bracket 661, a moveable bracket 662, a bushing removal tool 634A controlled by a first hydraulic actuator 630A, and a bushing removal tool 634B controlled by a second hydraulic actuator 630B. The lower control arm 100 includes the nut 110 to be removed and the bushings 120 to be removed. By contacting the bushings 120 from the respective outside surfaces of the bushings 120, the bushing removal tool 634A and the bushing removal tool 634B may displace the bushings 120 from the lower control arm 100.

Figure 17:
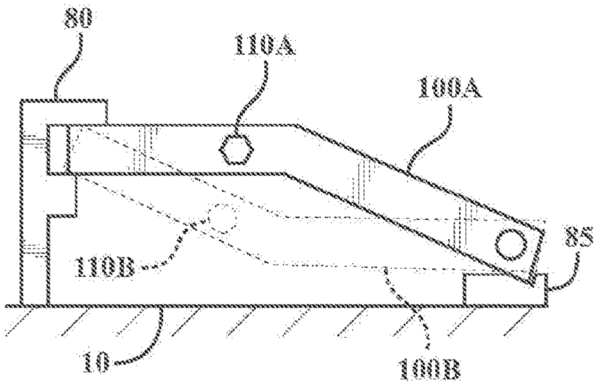
FIG. 17 schematically illustrates in left side view an exemplary alternative lower control arm decommissioning device operable to service a right lower control arm and a left lower control arm in a single set of fixtures, in accordance with the present disclosure.
Figure 18:
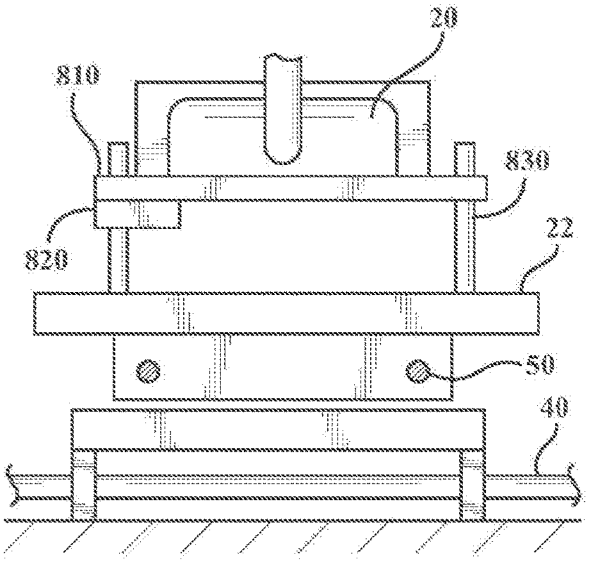
FIG. 18 schematically illustrates in left side view an exemplary mobile table and rotary tool operable to move in three axes in order to remove a nut from either of the lower control arms illustrated in FIG. 17, in accordance with the present disclosure.

FIG. 17 schematically illustrates in left side view an exemplary alternative lower control arm decommissioning device operable to service a right lower control arm and a left lower control arm in a single set of fixtures. In some embodiments, a right lower control arm 100A and a left lower control arm 100B may be held in place relative to tabletop 10 by a common set of fixtures, including fixture mechanism 80 and support fixture 85. As a result of holding the different lower control arms in the same fixtures, details such as a location of a nut 110A and location of a nut 110B may change. FIG. 18 schematically illustrates in left side view an exemplary mobile table and rotary tool operable to move in three axes in order to remove a nut from either of the lower control arms illustrated in FIG. 17. The mobile table 22 including the rails 40 and the rails 50 is illustrated including an elevating table 810. The elevating table 810 includes a motorized elevation device 820 and vertical posts 830. The elevating table 810 enables vertical adjustment of the rotary tool 20.

Figure 19:
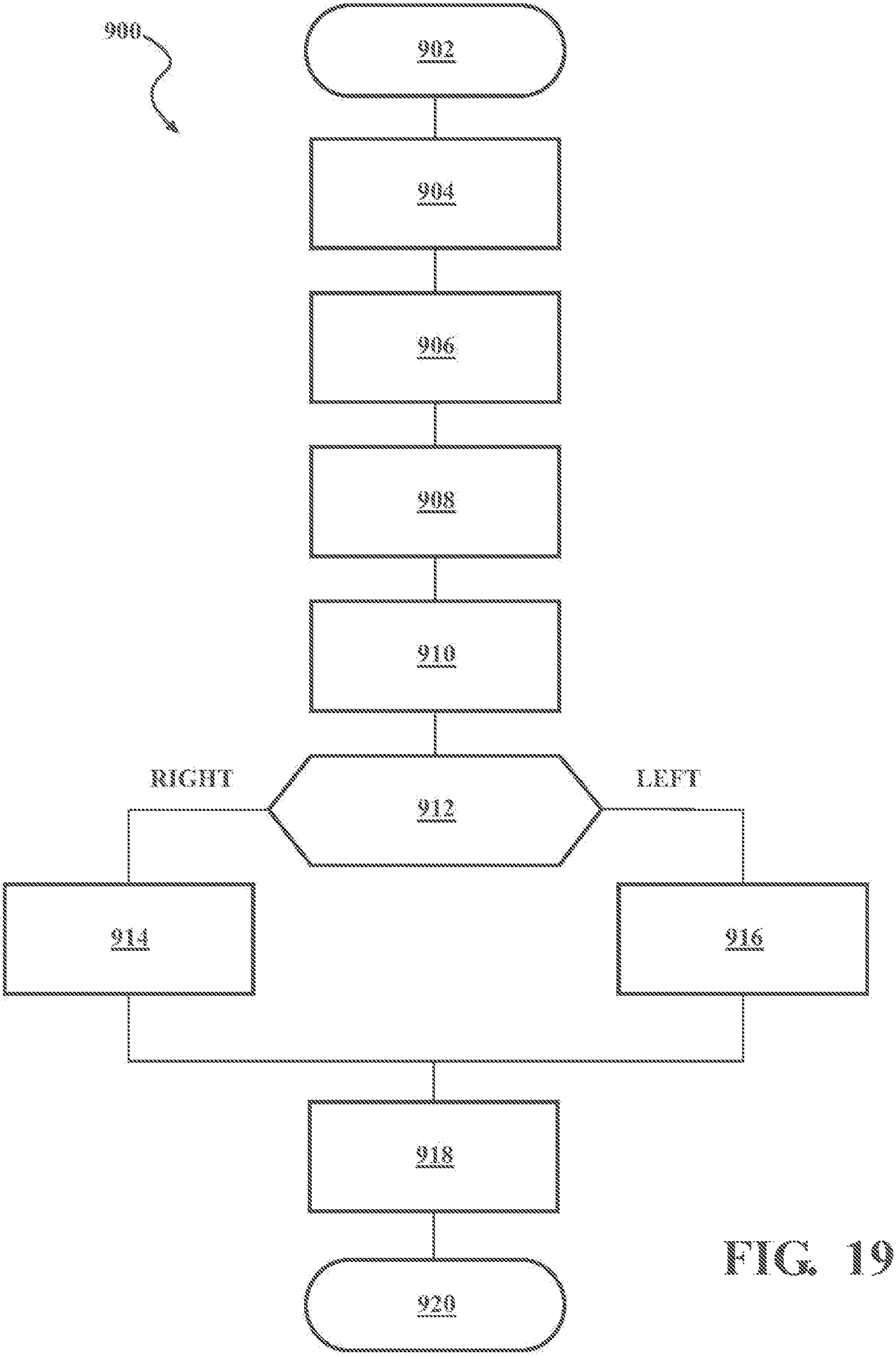
FIG. 19 is a flowchart illustrating a method to control a lower control arm decommissioning device to decommission a lower control arm, in accordance with the present disclosure.

FIG. 19 is a flowchart illustrating a method 900 to control a lower control arm decommissioning device 5 of FIG. 1 to decommission a lower control arm 100 of FIG. 1. The method 900 starts at step 902. At step 904, the lower control arm 100 is fixtured to the lower control arm decommissioning device 5. At step 906, a control input from a user is monitored indicating that the device is to cycle. At step 908, first hydraulic actuator 30A and a second hydraulic actuator 30B are cycled, wherein both are first extended such that two bushings 120 are dislocated from the lower control arm 100 and then both are retracted to an original position. In one embodiment, where the two bushings 120 are to be removed from the lower control arm 100, the method 900 may end after the step 908. In the embodiment of FIG. 19 wherein a 110 nut is additionally to be removed from the lower control arm 100, at step 910, a sensor device 590 is monitored and a location of the nut 110 upon the lower control arm 100 is determined. At step 912, a determination is made, based upon signals from the sensor device 590, whether the nut 110 is located at a first position corresponding to a right control arm or at a second position corresponding to a left control arm. If the nut 110 is located at the first position corresponding to the right control arm, the method 900 advances to step 914, where a rotary tool is moved to a position corresponding to removing the nut 110 from a right control arm and the nut 110 is removed. If the nut 110 is located at the second position corresponding to the left control arm, the method 900 advances to step 916, where a rotary tool is moved to a position corresponding to removing the nut 110 from a left control arm and the nut 110 is removed. At step 918, the lower control arm 100 is released from the lower control arm decommissioning device 5, the two bushings 120 and the nut 110 may be retrieved and disposed of, and the lower control arm decommissioning device 5 may return to an original condition in preparation for being operated again. At step 920, the method 900 ends. The method 900 provides exemplary steps for operating the lower control arm decommissioning device 5. A number of additional or alternative steps are envisioned, and the disclosure is not intended to be limited to the examples provided.

While the best modes for carrying out the disclosure have been described in detail, those familiar with the art to which this disclosure relates will recognize various alternative designs and embodiments for practicing the disclosure within the scope of the appended claims.

What is claimed is:

1. A lower control arm decommissioning device, comprising:
- a tabletop;
- a fixture operable to hold a lower control arm in a fixed position relative to the tabletop;
- two opposing bushing removal tools configured for pushing simultaneously on two bushings of the lower control arm and displacing the two bushings from the lower control arm;
- an air over hydraulics booster; and
- two hydraulic actuators receiving pressurized hydraulic fluid from the air over hydraulics booster, each hydraulic actuator providing force to a respective one of the opposing bushing removal tools.

2. The lower control arm decommissioning device of claim 1, wherein each of the two opposing bushing removal tools are configured for pushing outwardly upon an inner surface of a respective one of the two bushings.

3. The lower control arm decommissioning device of claim 1, wherein each of the two opposing bushing removal tools are configured for pushing inwardly upon an inner surface of a respective one of the two bushings.

4. The lower control arm decommissioning device of claim 1, wherein the fixture includes a first fixture;
- further comprising a second fixture;
- wherein the first fixture is configured for holding a right lower control arm version of the lower control arm in a first position enabling the two opposing bushing removal tools to push on two bushings of the right lower control arm version of the lower control arm; and
- wherein the second fixture is configured for holding a left lower control arm version of the lower control arm in a second position enabling the two opposing bushing removal tools to push on two bushings of the left lower control arm version of the lower control arm.

5. The lower control arm decommissioning device of claim 4, further comprising a rotary tool configured for removing a threaded fastener from the lower control arm.

6. The lower control arm decommissioning device of claim 5, wherein the rotary tool is moveable from a third position configured for removing a threaded fastener from the right lower control arm version of the lower control arm to a fourth position configured for removing a threaded fastener from the left lower control arm version of the lower control arm.

7. A lower control arm decommissioning device, comprising:
a tabletop;
a first fixture operable to hold a lower control arm in a fixed position relative to the tabletop;
two opposing bushing removal tools configured for pushing simultaneously on two bushings of the lower control arm and displacing the two bushings from the lower control arm;
a second fixture;
wherein the first fixture is configured for holding a right lower control arm version of the lower control arm in a first position enabling the two opposing bushing removal tools to push on two bushings of the right lower control arm version of the lower control arm;
wherein the second fixture is configured for holding a left lower control arm version of the lower control arm in a second position enabling the two opposing bushing removal tools to push on two bushings of the left lower control arm version of the lower control arm;
further comprising a rotary tool configured for removing a threaded fastener from the lower control arm;
wherein the rotary tool is moveable from a third position configured for removing a threaded fastener from the right lower control arm version of the lower control arm to a fourth position configured for removing a threaded fastener from the left lower control arm version of the lower control arm; and
further comprising:
a sensor device providing data related to determining which version of the lower control arm is present; and
a computerized device controller including programming to:
monitor the data from the sensor device;
determine which version of the lower control arm is present; and
control movement of the rotary tool to the third position or the fourth position based upon the version of the lower control arm present.

8. The lower control arm decommissioning device of claim 1, further comprising a rotary tool configured for removing a threaded fastener from the lower control arm.

9. A lower control arm decommissioning device, comprising:
a tabletop parallel to a ground surface;
a fixture operable to hold a lower control arm in a fixed position relative to the tabletop;
a mobile table operable to move in a first direction parallel to the tabletop toward and away from the lower control arm;
a rotary tool connected to the mobile table and operable to remove a threaded fastener from the lower control arm; and
two opposing bushing removal tools configured for pushing simultaneously on two bushings of the lower control arm and displacing the two bushings from the lower control arm.

10. The lower control arm decommissioning device of claim 9, wherein the mobile table is further operable to move in a second direction perpendicular to the first direction and parallel to the tabletop.

11. The lower control arm decommissioning device of claim 10, wherein the mobile table is further operable to move in a third vertical direction.

12. The lower control arm decommissioning device of claim 9, wherein the fixture includes a first fixture;
further comprising a second fixture;
wherein the first fixture is configured for holding a right lower control arm version of the lower control arm in a first position enabling the two opposing bushing removal tools to push on two bushings of the right lower control arm version of the lower control arm; and
wherein the second fixture is configured for holding a left lower control arm version of the lower control arm in a second position enabling the two opposing bushing removal tools to push on two bushings of the left lower control arm version of the control arm.

13. The lower control arm decommissioning device of claim 12, wherein the mobile table is further operable to move in a second direction perpendicular to the first direction and parallel to the tabletop; and
further comprising:
a sensor device providing data related to determining which version of the lower control arm is present; and
a computerized device controller including programming to:
monitor the data from the sensor device;
determine which version of the lower control arm is present; and
control movement of the rotary tool in the first direction and the second direction based upon the version of the lower control arm present.

* * * * *